United States Patent
Li et al.

(10) Patent No.: US 12,221,109 B2
(45) Date of Patent: Feb. 11, 2025

(54) ROAD CONGESTION-AWARE AUTOMATIC LANE CHANGE ACTIVATION BEFORE LANE TERMINATION

(71) Applicant: GM Global Technology Operations LLC, Detroit, MI (US)

(72) Inventors: Chuan Li, Troy, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 218 days.

(21) Appl. No.: 18/045,250

(22) Filed: Oct. 10, 2022

(65) Prior Publication Data

US 2024/0116510 A1 Apr. 11, 2024

(51) Int. Cl.
*B60W 30/18* (2012.01)
*B60W 40/04* (2006.01)
(Continued)

(52) U.S. Cl.
CPC ...... *B60W 30/18163* (2013.01); *B60W 40/04* (2013.01); *B60W 50/14* (2013.01); *B60W 60/0015* (2020.02); *B60W 2050/0028* (2013.01); *B60W 2050/146* (2013.01); *B60W 2554/406* (2020.02); *B60W 2554/80* (2020.02); *B60W 2556/40* (2020.02); *B60W 2556/50* (2020.02)

(58) Field of Classification Search
CPC ........ B60K 2360/166; B60K 2360/167; B60K 2360/175; B60K 2360/178; B60K 2360/1868; B60K 35/22; B60K 35/28; B60W 2050/0028; B60W 2050/146; B60W 2540/215; B60W 2554/406; B60W 2554/80; B60W 2556/40; B60W 2556/50; B60W 30/18163; B60W 40/04; B60W 50/14; B60W 60/0015
See application file for complete search history.

(56) References Cited

U.S. PATENT DOCUMENTS 10,328,935 B2 * 6/2019 O'Dea .............. B60W 60/0015
11,548,511 B2 * 1/2023 Parks ..................... G08G 1/167
(Continued)

OTHER PUBLICATIONS

United States Patent and Trademark Office. U.S. Appl. No. 17/389,489, filed Jul. 30, 2021.

*Primary Examiner* — Carl C Staubach
(74) *Attorney, Agent, or Firm* — Vivacqua Crane, PLLC

(57) ABSTRACT

An automatic lane change activation system includes a host vehicle including an in-vehicle computer. A telematics module communicates global positioning system (GPS) data between the computer and the telematics module. A host vehicle display device receives signals from the computer. A visual system status is presented to a host vehicle user by the display device including an information screen presenting a roadway information message, a control screen presenting an opportunity message identifying to the user an opportunity to switch the host vehicle from a first roadway lane into a second roadway lane, and a lane change directional arrow to indicate a path for the host vehicle to take. A motion control module in the host vehicle receives control signals from the computer including a lane change execution signal to initiate and control vehicle automatic lane changes in a non-congested area of a roadway for the host vehicle.

6 Claims, 6 Drawing Sheets

(51) Int. Cl.
  *B60W 50/14*   (2020.01)
  *B60W 60/00*   (2020.01)
  *B60W 50/00*   (2006.01)

(56) References Cited

U.S. PATENT DOCUMENTS

| | | | |
|---|---|---|---|
| 11,560,154 B1* | 1/2023 | Gate | G01C 21/3614 |
| 2012/0193153 A1* | 8/2012 | Wellborn | B60W 10/08 |
| | | | 180/14.2 |
| 2017/0076607 A1* | 3/2017 | Linder | B60W 30/0956 |
| 2020/0372262 A1* | 11/2020 | Ma | B60W 40/04 |
| 2021/0053572 A1* | 2/2021 | Vasoya | B60W 40/04 |
| 2021/0188275 A1* | 6/2021 | Matsumura | B60W 60/0053 |
| 2021/0253104 A1* | 8/2021 | Takamatsu | B60W 60/0021 |
| 2022/0038860 A1* | 2/2022 | Xu | G08G 1/096775 |
| 2022/0176952 A1* | 6/2022 | Nanri | G06V 20/56 |
| 2022/0176986 A1* | 6/2022 | Lei | B60W 60/001 |
| 2022/0289228 A1* | 9/2022 | Yamamoto | B60K 35/28 |
| 2022/0340166 A1* | 10/2022 | Kume | G08G 1/0133 |
| 2022/0397402 A1* | 12/2022 | Bolless | G08G 1/0141 |
| 2023/0031251 A1* | 2/2023 | Chen | G08G 1/20 |
| 2023/0278562 A1* | 9/2023 | Parks | B60W 60/001 |
| | | | 701/532 |
| 2023/0286509 A1* | 9/2023 | Kume | B60W 60/0051 |
| 2023/0406316 A1* | 12/2023 | Kume | B60W 30/18163 |

* cited by examiner

ROAD CONGESTION-AWARE AUTOMATIC LANE CHANGE ACTIVATION BEFORE LANE TERMINATION

INTRODUCTION

The present disclosure relates to vehicle operational control systems.

Vehicles including autonomously operated vehicles receive road data that identify upcoming road conditions. The road data may include high definition (HD) map details such as topology variations and road geometry which are necessary for autonomous vehicle navigation system operation. HD map data is updated regularly, however routine updates occur in at least six month intervals, which therefore may not provide up-to-date data for daily use, particularly when road lane changes occur such as temporary lane closures, accident lane closures, emergency conditions and the like that affect lane availability. The United States Department of Transportation (USDOT) and multiple mobile phone data services provide more up-to-date information on road travel conditions and lane change issues.

Some vehicle manufacturers currently implement extensive telemetry solutions into vehicle designs, however the availability of the above up-to-date telemetry information combined with the ability to implement automatic lane changes due to changing lane conditions is not currently available.

Thus, while current vehicle telemetry control systems achieve their intended purpose, there is a need for a new and improved vehicle automatic lane change system and method.

SUMMARY

According to several aspects, an automatic lane change activation system includes a host vehicle including an in-vehicle computer. A telematics module communicates global positioning system (GPS) data between the computer and the telematics module. A display device of the host vehicle receives message signals from the computer. A visual system status presented to a user of the host vehicle by the display device includes an information screen presenting a roadway information message, a control screen presenting an opportunity message identifying to the user an opportunity to switch the host vehicle from a first roadway lane into a second roadway lane, and a lane change directional arrow to indicate a path for the host vehicle to take. A motion control module in the host vehicle receives control signals from the computer including a lane change execution signal to initiate and control vehicle automatic lane changes in a non-congested area of a roadway for the host vehicle.

In another aspect of the present disclosure, the host vehicle defines an autonomous vehicle and includes a map database providing roadway data to the computer including identification of a host lane being traversed by the host vehicle.

In another aspect of the present disclosure, a body control module in the host vehicle receives the control signals from the computer including but not limited to a turn signal activation signal and avoids automatic lane changes in a highly congested area.

In another aspect of the present disclosure, a motion control module in the host vehicle receives control signals from the computer including but not limited to a lane change execution signal.

In another aspect of the present disclosure, the non-congested area defines a first roadway area including the first roadway lane and the second roadway lane having the host vehicle and multiple other vehicles traveling at a posted speed limit and at recommended vehicle-to-vehicle spacings depending on the posted speed limit; and the highly congested area defines a second roadway area having further vehicles traveling at less than the posted speed limit and at reduced vehicle-to-vehicle spacings approaching and within a lane closure area having one of the first roadway lane and the second roadway lane closed.

In another aspect of the present disclosure, a headway sampling module is provided wherein a distance between successive vehicles in a same roadway lane including a distance between the host vehicle and a second vehicle is determined; and a location sampling module is provided wherein location sampling of vehicles within a highly congested area ahead of the non-congested are obtained.

In another aspect of the present disclosure, multiple speed differences are individually calculated between the successive vehicles identified by the location sampling module; and a speed arbitration module monitors one or more of the multiple speed differences and identifying average speed differences.

In another aspect of the present disclosure, a first cloud having vehicle population tracking data, probabilistic opportunity data and turn signal statistics data communicates with the telematics module; and a second cloud provides information including roadway construction data accessible by the first cloud.

In another aspect of the present disclosure, a probabilistic opportunity determination module identifies a probability of the host vehicle being able to complete a lane change from the first roadway lane to the second roadway lane within the non-congested area between a lane change control point Pc within the non-congested area and prior to a congestion point $C_1$ within the highly congested area.

In another aspect of the present disclosure, a group of perception sensors of the host vehicle in communication with the computer receive local environment data, vehicle speed and heading data.

According to several aspects, a method for activating a vehicle automatic lane change comprises: obtaining an approximate vehicle location distribution in a non-congested area of a roadway; communicating global positioning system (GPS) data and the vehicle location distribution between an in-vehicle computer and a telematics module of a host vehicle; performing an estimate of a probability of a successful lane change from a lane change control point (Pc) in the non-congested area to a congestion point ($C_1$) in a congested area of the roadway; determining an average headway of vehicles in the non-congested area; calculating a safe lane change headway distance in a target roadway lane for the host vehicle; and generating control signals including a lane change execution signal to initiate and control vehicle automatic lane change to the target roadway lane in the non-congested area for the host vehicle.

In another aspect of the present disclosure, the method further includes performing a probability estimation adjustment using turn signal statistics by: adjusting a vehicle population or density estimation using turn signal statistics as feedback; and applying a turn signal sample record including a latitude, a longitude, a heading, a signal-status and a timestamp.

In another aspect of the present disclosure, the method further includes: performing a vehicle density adjustment, assuming a lane change duration T and a turn signal active total time duration $T$, an opportunity seeking duration is $T-T$; inferring a host vehicle speed through telemetry; and determining a vehicle count adjustment on a virtual road segment of the roadway assuming a minimum vehicle gap between vehicles on the roadway, and a vehicle count adjustment on the virtual road segment where the vehicle count is defined by multiple vehicle sample points on a virtual segment length of the roadway.

In another aspect of the present disclosure, the method further includes: estimating a lane change opportunity applying an updated expected headway; and applying a predetermined speed difference threshold when a speed difference between vehicles in adjacent lanes of the roadway is present.

In another aspect of the present disclosure, the method further includes comparing a vehicle arrival rate and a vehicle passing rate at a lane closure over time to determine when the congested area is present.

In another aspect of the present disclosure, the method further includes: identifying if a constant passing rate in a short time duration defining a time duration of approximately 10 minutes occurs in a vehicle queueing region; calculating a time required to complete passage through the vehicle queueing region; and leveraging a vehicle telemetry to identify a time taken to complete passage through the lane closure at the vehicle queueing region.

In another aspect of the present disclosure, the method further includes: leveraging a queuing model to identify if a vehicle queue is building in vehicle volume in the vehicle queueing region; and applying a clustering algorithm to identify when the congested area is present and if the queueing region is building in vehicle volume.

According to several aspects, a method for performing a vehicle automatic lane change comprises: obtaining an approximate vehicle location distribution in a non-congested area of a roadway, including having a global positioning system (GPS) position, a headway telemetry position, a host lane determination and a per-lane vehicle position following a Poisson Point Process of expected headway in the non-congested area; adjusting a vehicle population or density estimation; performing an estimate of a probability of a successful lane change from a lane change control point (Pc) to a congestion point ($C_1$) in the congested area; determining an average headway of vehicles in the non-congested area; calculating a safe lane change headway distance; and determining a time gap to perform a lane change at least once between any two consecutive vehicle arrivals using an assumed vehicle speed of upcoming vehicles.

In another aspect of the present disclosure, the method further includes using turn signal statistics as feedback when adjusting the vehicle population or the density estimation.

In another aspect of the present disclosure, the method further includes generating control signals including a lane change execution signal to initiate and control vehicle automatic lane change in the non-congested area for a host vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
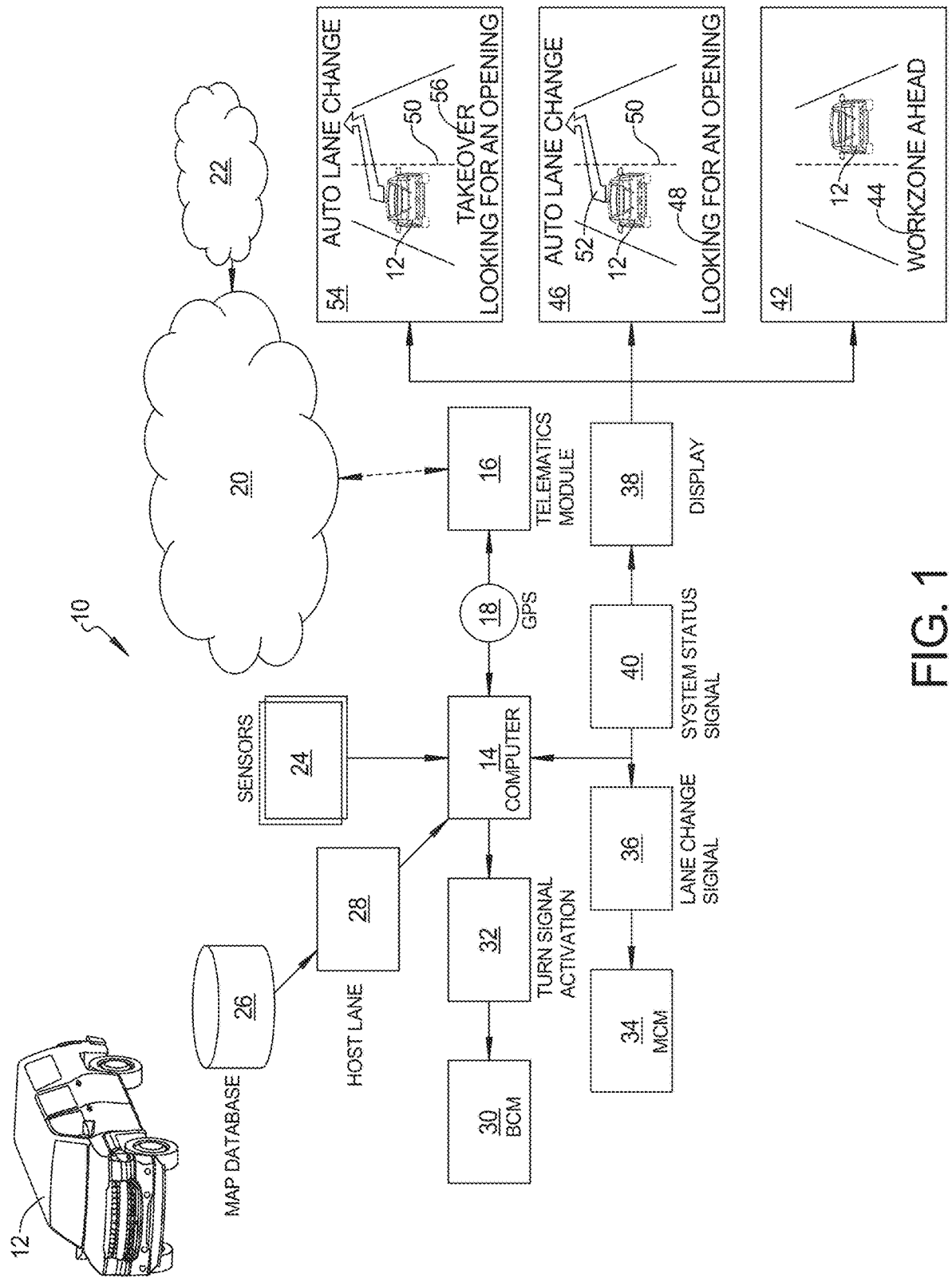
FIG. 1 is a flow diagram of an automatic lane change activation system according to an exemplary aspect.

Referring to FIG. 1, an automatic lane change activation system 10 for a vehicle and a method of operation of an automatic lane change activation system includes a host vehicle 12 which may define an autonomous vehicle. The host vehicle 12 includes a computer 14 which may be in-vehicle in communication with a telematics module 16 communicating global positioning system (GPS) data 18 between the computer 14 and the telematics module 16. A first cloud 20 having for example vehicle population tracking data, probabilistic opportunity data and turn signal statistics data communicates with the telematics module 16. A second cloud 22 provides information having lane closure data including but not limited to roadway construction data which is accessible by the first cloud 20.

A group of perception sensors 24 in communication with the computer 14 are provided with the host vehicle 12 which receive local environment data, vehicle speed, heading and the like data. A map database 26 provides roadway data to the computer 14 including identification of a host lane 28 being traversed by the host vehicle 12. A body control module 30 in the host vehicle 12 receives control signals from the computer 14 including but not limited to a turn signal activation signal 32. A motion control module 34 in the host vehicle 12 receives the control signals from the computer 14 including but not limited to a lane change execution signal 36. A display device 38 of the host vehicle 12 receives signals from the computer 14 including but not limited to a vehicle system status signal 40 and presents visual system status to a user of the host vehicle 12.

Examples of the system status which may be presented by the display device 38 include an information screen 42 presenting for example roadway information message 44 such as a Work-Zone Ahead text message, a lane change warning message, an accident ahead message, and the like. A control screen 46 presents a Looking For An Opening text message 48 identifying to the user an opportunity to switch the host vehicle 12 into another roadway lane having a lane divider 50 therebetween, together with a auto-lane change directional arrow 52 to indicate a path for the host vehicle 12 to take. If an automatic lane change is not deemed to be appropriate, an alert screen 54 presents an instruction to the vehicle user to conduct a manual takeover 56 when necessary to move the host vehicle manually over the lane divider 50.

The computer 14 described in reference to FIG. 1 is a non-generalized, electronic control device having a preprogrammed digital controller or processor, memory or non-transitory computer readable medium used to store data such as control logic, software applications, instructions, computer code, data, lookup tables, etc., and a transceiver or input/output ports. The computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium excludes wired, wireless, optical, or other communication links that transport transitory electrical or other signals. The non-transitory computer readable medium includes media where data can be permanently stored and media where data can be stored and later overwritten, such as a rewritable optical disc or an erasable memory device. Computer code includes any type of program code, including source code, object code, and executable code.

Referring to FIGS. 2A and 2B and again to FIG. 1, various component segments of an exemplary roadway 58 and various analysis components are presented. With specific reference to FIG. 2A, according to several aspects, the roadway 58 includes a first roadway lane 60 in which the host vehicle 12 is currently traveling and at least a second roadway lane 62 which in a present example defines a target roadway lane to which the host vehicle 12 will move. In addition to the host vehicle 12, a second vehicle 64 may also be traveling in front of the host vehicle 12, a third vehicle 66 and a fourth vehicle 68 may be traveling in the second lane 62, together in a roadway area defined as a non-congested area 70. The non-congested area defines a first roadway area which in the example presented includes the first roadway lane 60 and the second roadway lane 62 having the host vehicle 12, the second vehicle 64, the third vehicle 66 and the fourth vehicle 68 all traveling at a posted speed limit and at recommended vehicle-to-vehicle spacings depending on the posted speed limit.

A highly congested area 72 ahead of the non-congested area 70 defines a second roadway area which in the example presented includes a portion of the first roadway lane 60 and the second roadway lane 62 having a fifth vehicle 74 and a sixth vehicle 76 all traveling at less than the posted speed limit and at reduced vehicle-to-vehicle spacings approaching and within a lane closure area 73, beyond which all vehicles are temporarily required to shift into and drive in this example in the second roadway lane 62.

The automatic lane change activation system 10 of the present disclosure initiates and controls vehicle automatic lane changes when practical in the non-congested area 70 for the host vehicle 12, while avoiding automatic lane changes in the highly congested area 72. An overview of operation of the automatic lane change activation system 10 includes obtaining an approximate vehicle location distribution in the non-congested area 70 which is described in greater detail in reference to FIGS. 3 through 6 and performing an estimate of a probability of a successful lane change from a lane change control point (Pc) to a congestion point ($C_1$). The lane change control point (Pc) denotes a position on the roadway 58 ahead of the congestion point $C_1$ providing sufficient distance to perform a successful automatic lane change to the target lane.

A final lane change point $C_O$ defines a start of the lane closure area 73 designating a position on the roadway 58 within the highly congested area 72 where all vehicles including the host vehicle 12, the second vehicle 64, the third vehicle 66, the fourth vehicle 68, as well as the fifth vehicle 74 and the sixth vehicle 76 shown within the highly congested area 72 must have completed a lane change into the second lane 62.

Referring more specifically to FIG. 2B and again to FIG. 2A, obtaining an approximate vehicle location distribution in the non-congested area 70 may be performed using a headway sampling module 78 wherein a distance between successive vehicles such as a distance between the host vehicle 12 and the second vehicle 64 is determined. Location sampling of vehicles within the highly congested area 72 may be obtained using a location sampling module 80. A speed difference 82 between the various sampled vehicles is calculated and forwarded to a speed arbitration module 84 to monitor speed differences and identify average speed differences. Roadway data is extracted from the map database 26 described above in reference to FIG. 1 necessary to assist in vehicle speed and heading calculations.

With continuing reference to FIG. 2B, vehicle speed values from the speed arbitration module 84 and vehicle location distribution data from the headway sampling module 78 are forwarded to a probability determination module 86. A headway statistics module 88 identifies vehicle headway data and a vehicle count estimation module 90 calculates an estimated vehicle volume in the non-congested area 70 and in the highly congested area 72. Outputs of the headway statistics module 88 and the vehicle count estimation module 90 are forwarded to a probabilistic opportunity determination module 92 which identifies a probability of the host vehicle 12 being able to complete a lane change from the first lane 60 to the second lane 62 between the lane change control point Pc and the congestion point $C_1$. If a successful lane change is deemed probable by the probabilistic opportunity determination module 92 an output signal is forwarded to an autonomous vehicle lane change logic module 94 for calculation of the control signals required to alter the path of the host vehicle 12. If the autonomous vehicle lane change logic module 94 identifies that an insufficient host vehicle turn signal time frame or a probabilistic failure to achieve the lane change is present, the program returns to the vehicle count estimation module 90 for continued monitoring of the opportunity for a successful automatic lane change operation.

Figure 2:
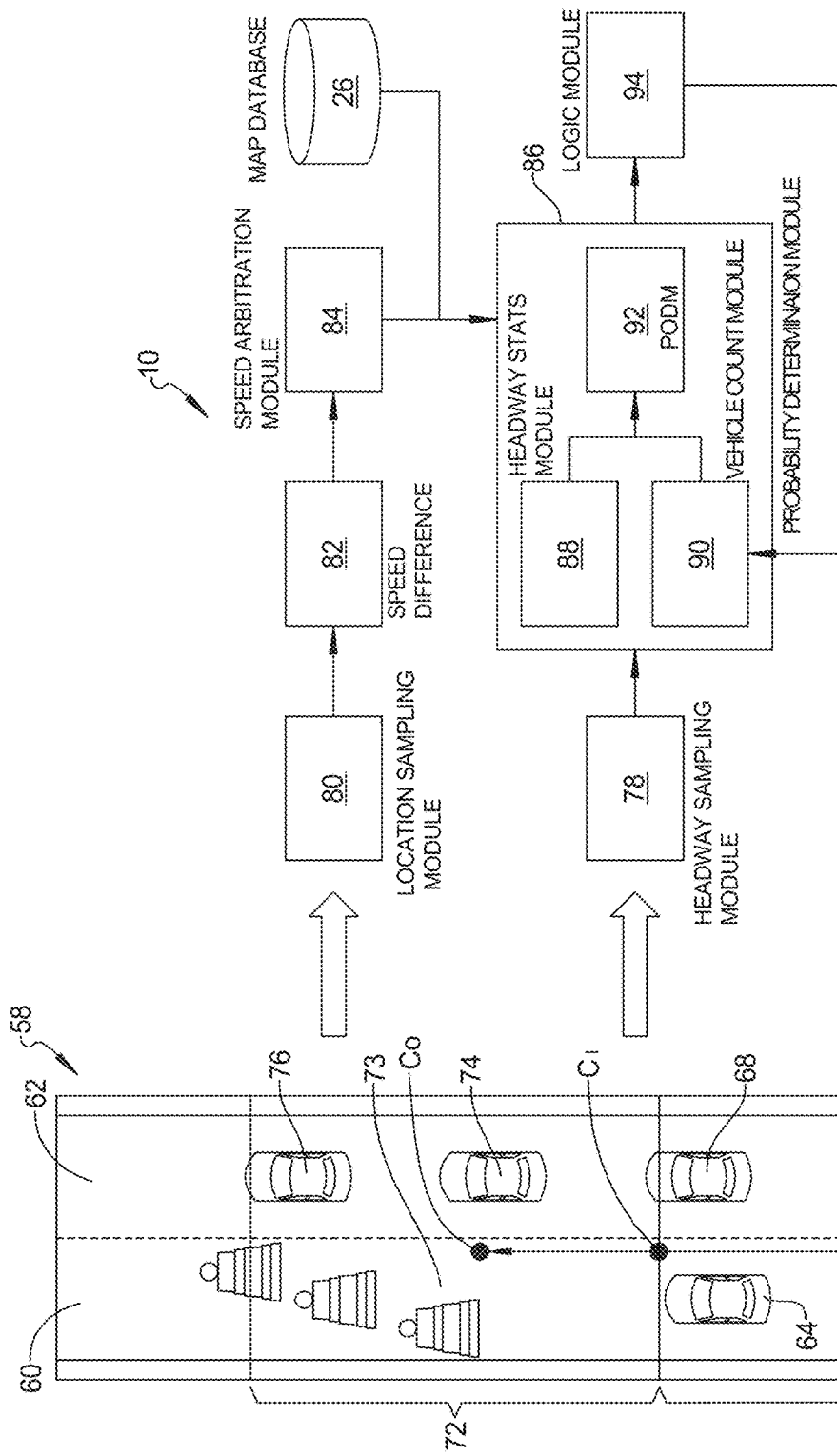
FIG. 2A is a plan view of an exemplary congested roadway analyzed by the system of FIG. 1.
FIG. 2B is a flow diagram of system features employed to analyze the congested roadway of FIG. 2A.

Referring to FIG. 3 and again to FIGS. 1 and 2, to determine if the highly congested area 72 exists a comparison is performed between vehicle arrival rates in the non-congested area 70 and vehicle pass rates in an upcoming transition area 96. When the highly congested area 72 is identified, the automatic lane change activation system 10 applies vehicle turn signal statistics as described in reference to FIGS. 5 through 6 below to automatically adjust the probability estimation.

Figure 4:
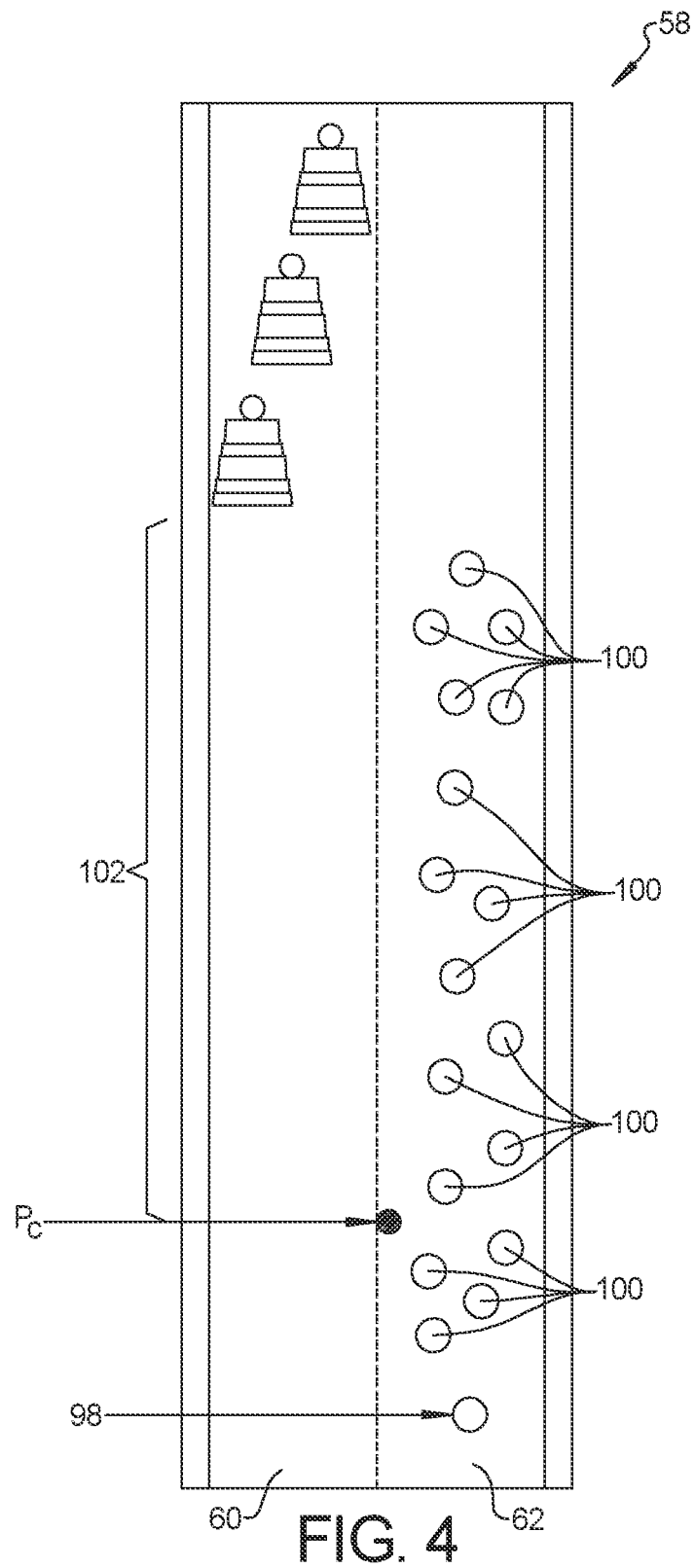
FIG. 4 is a plan view of the congested roadway of FIG. 2A showing a virtual segment length and multiple vehicle sample points.

Referring to FIG. 4, the automatic lane change activation system 10 applies a probabilistic model to estimate a successful lane change probability while the host vehicle 12 is a predetermined distance away from the congested area 72. The automatic lane change activation system 10 incorporates assumptions that GPS, headway telemetry, host lane determination and per-lane vehicle positions follow a Poisson Point Process of expected headway A in the non-congested area 70.

A headway sample record includes a latitude, a longitude, a heading, a headway and timestamp data. An average headway is determined considering a headway sample 98 also designated headway (H) from telemetry, where the expected headway λ=avg H. A vehicle count shown by multiple vehicle sample points 100 also designated (V) on a virtual segment length 102 of the roadway 58 designated ($S_o$) is given by equation 1 below.

$$V = S_o/\lambda \qquad \text{Equation 1:}$$

Where: V is a vehicle count within the virtual segment length, $S_o$ is a virtual roadway segment length, and λ is the expected headway from above.

A safe lane change headway distance is then determined. Assuming the upcoming vehicles move at a speed v, and a lane change requires a vehicle gap distance $d_o$ for a time gap to $t_o$ perform a safe lane change at least once between any two consecutive vehicle arrivals is found using equation 2 below.

$$t_o = d_o/v \qquad \text{Equation 2:}$$

Where: $t_o$ is a time gap for vehicle lane change, $d_o$ is a vehicle gap distance, and v is vehicle speed.

A probability p of having such a time gap $t_o$ which is $\geq d_o$ is given by Equation 3 below.

$$p(t>t_0) = e^{-\lambda t} \qquad \text{Equation 3:}$$

Where: p is a probability, t is a time between passage of successive vehicles, $t_o$ is a time gap for vehicle lane change, and λ is the expected headway from above.

When a speed difference between vehicles in adjacent lanes such as in the first roadway lane 60 and the second roadway lane 62 is too large, a lane change is considered not safe, therefore a predetermined speed difference threshold is applied which is identified as $\Delta v_o$.

To summarize, a feasibility of performing a lane change is given by equation 4 below applying the speed difference threshold $\Delta v_o$. Equation 4:

Lane Change Feasibility $f_o = \mu p(t>t_o) - (1-\mu)\Delta v \geq f_o$ when $\Delta v \geq \Delta v_o$ Where: μ is a constant, p is the probability from Equation 3 above, t is a time between passage of successive vehicles and to is a time gap for vehicle lane change from Equation 3 above, and Δv is a difference in vehicle speeds between for vehicles in two proximate or adjacent roadway lanes, and λ is the expected headway from above.

Referring to FIG. 5 and again to FIG. 4, a probability estimation adjustment may then by performed using turn signal statistics as follows. Initially, an adjustment of vehicle population or density estimation is performed using turn signal statistics as feedback. Assumptions for this estimation include a lane change determination using crowd sourced telemetry data and applying a turn signal sample record including a latitude, a longitude, a heading, a signal-status and a timestamp.

To perform a vehicle density adjustment, assuming a lane change duration $\mathsf{T}$ and a turn signal active total time duration $\mathsf{T}$, an opportunity seeking duration is $\mathsf{T} - \mathsf{T}$, assuming a vehicle density in the target lane is higher than previously estimated because the host vehicle 12 requires time to seek a feasible vehicle-to-vehicle gap distance in the target roadway lane. Through telemetry a vehicle speed v is inferred. Assuming a minimum vehicle gap d', a first vehicle count adjustment on the virtual road segment where the vehicle count is shown by multiple vehicle sample points 100 also designated (V) on the virtual segment length 102 of the roadway 58 designated ($S_o$) described above in reference to FIG. 4 permits determination of a second vehicle count adjustment ΔV on the virtual road segment using Equation 5 below.

$$\Delta V = [(\mathsf{T} - \mathsf{T})v/d'] - [(\mathsf{T}-\mathsf{T})v/\lambda] \qquad \text{Equation 5:}$$

Where: $\mathsf{T}$ is a lane change duration, $\mathsf{T}$ is a turn signal active total time duration, v is a vehicle speed, d' is a minimum vehicle gap distance, and λ is the expected headway from above.

A new updated expected headway λ is given by $\lambda = S_o/(v+\Delta V)$. The updated expected headway λ may then be used to estimate a lane change opportunity.

Figure 3:
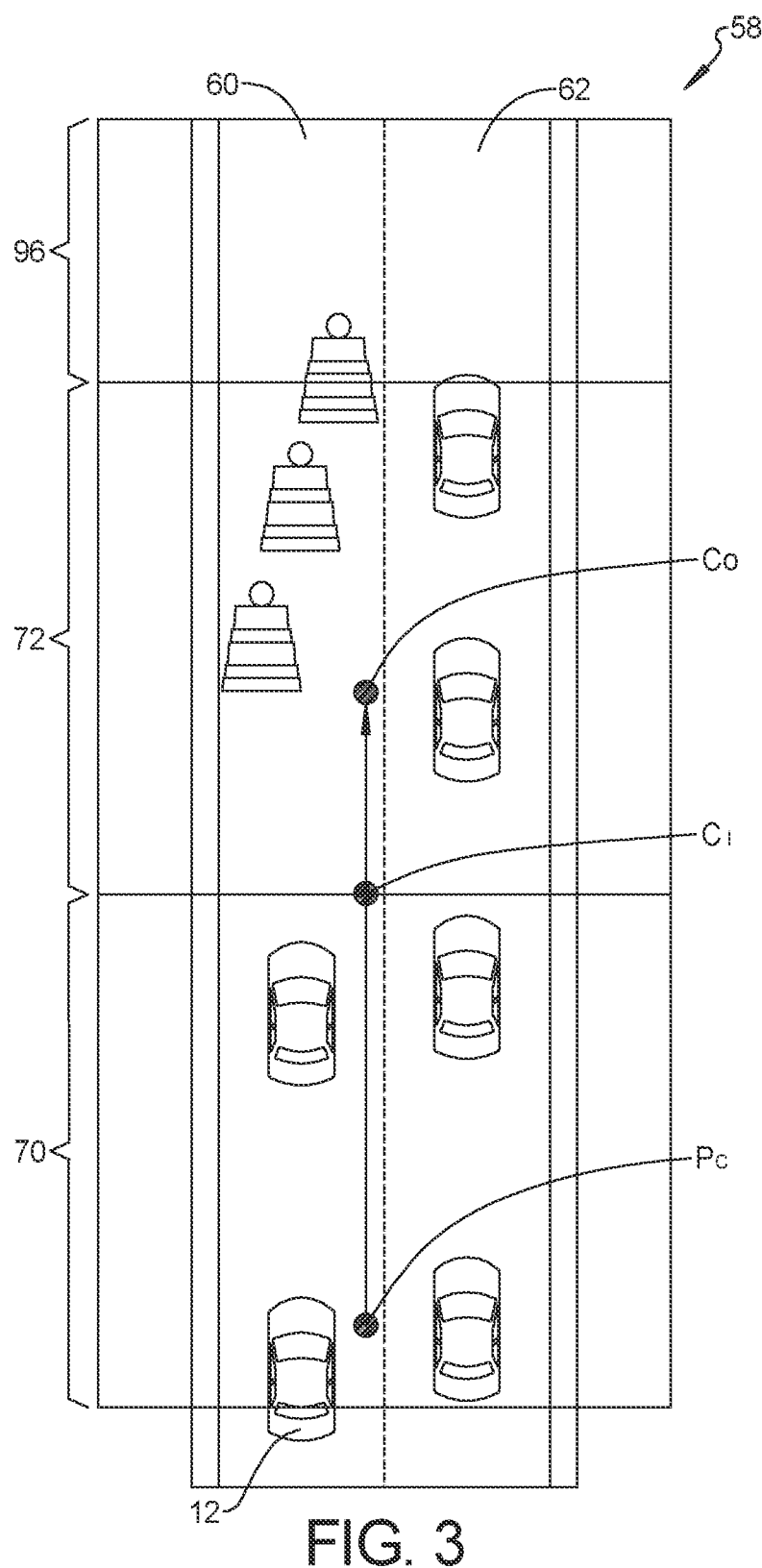
FIG. 3 is a plan view of the congested roadway of FIG. 2A modified to show a transition area.
Figure 5:
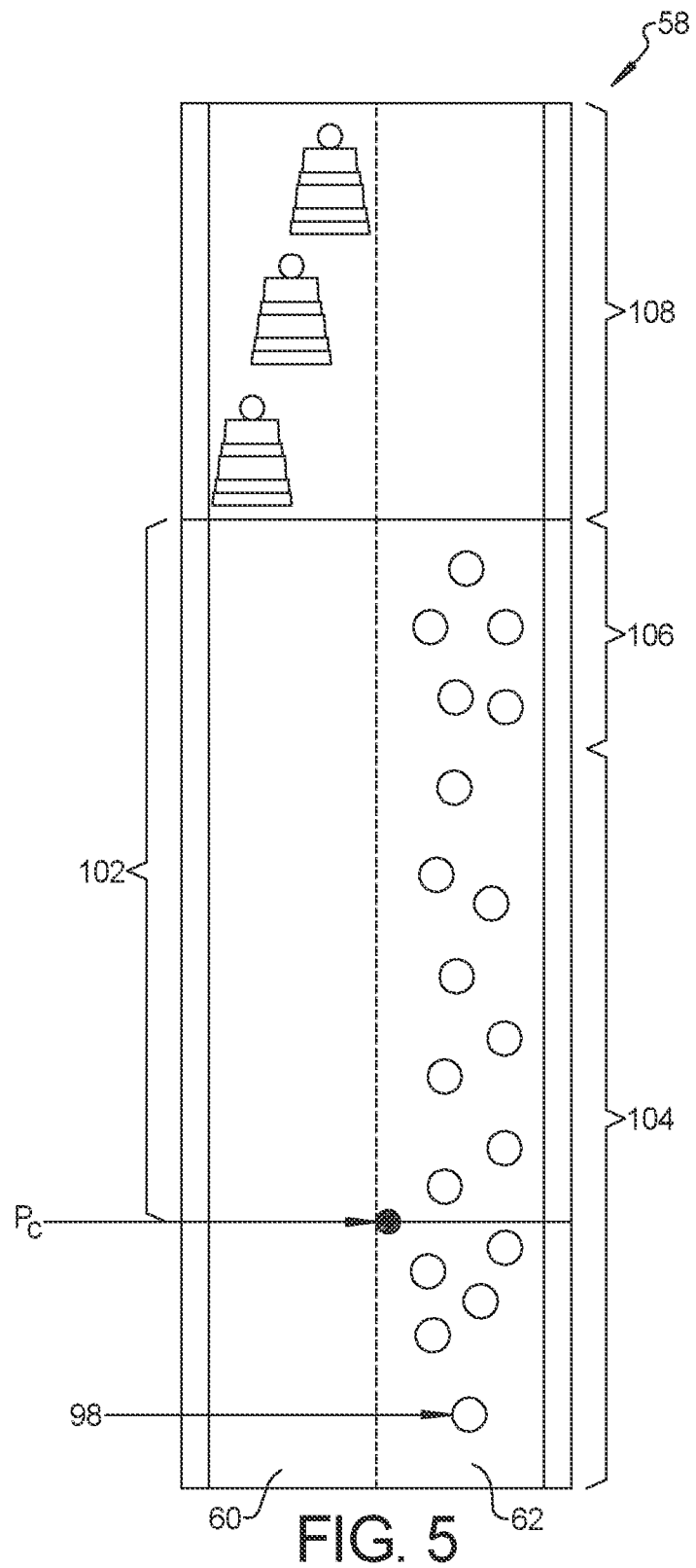
FIG. 5 is a plan view modified from FIG. 4 showing an area defining a short distance provided after lane closure to determine a quantity of vehicles in the roadway following lane closure.
Figure 6:
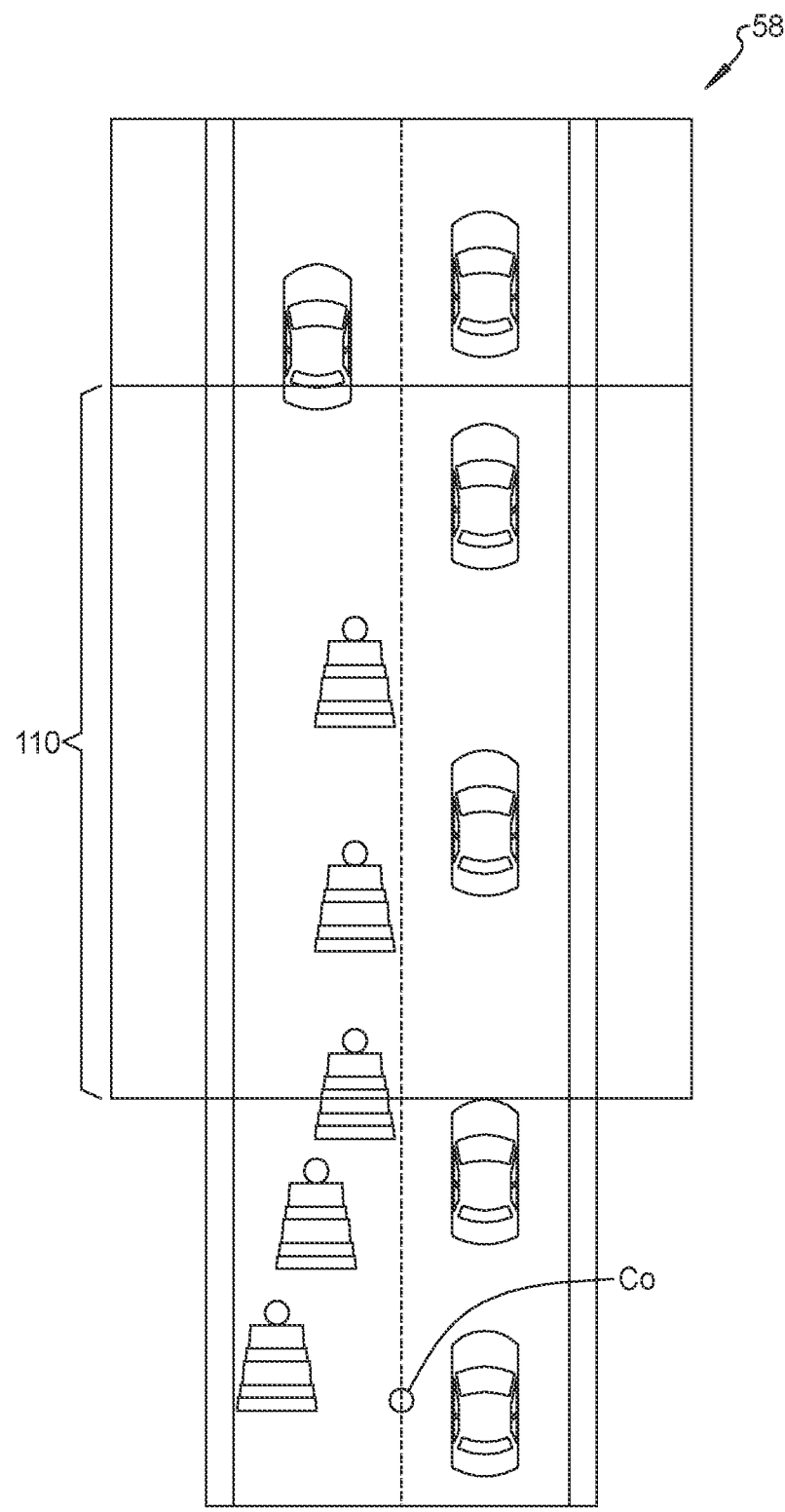
FIG. 6 is a plan view modified from FIG. 5 showing a vehicle queueing region wherein vehicle telemetry is leveraged to identify a time to complete passage through the lane closure.

Referring generally to FIGS. 5 and 6, a determination of a congested area such as the congested area 72 described in reference to FIG. 3 may be made by comparing a vehicle arrival rate and a vehicle passing rate at a lane closure over time. Referring more specifically to FIG. 5 and again to FIGS. 3 and 4, an area 104 defines a Poisson Point Process Area. If area 104 has a lower vehicle density, headway readings may vary between small and large variations, and a headway variation may be higher than in the non-congested area 70. An area 106 defines a potentially high vehicle density area. In the area 106 headway readings will be small, the vehicle speed may be reduced to a minimum and a headway variation may also be small. A length of the area 106 may have a zero (0) length and is therefore ignored when estimating a vehicle density using the Poisson Point Process. An area 108 defines a short distance provided after lane closure, for example after closure of the first roadway lane 60. Vehicle headway and vehicle speed are used to measure a number of vehicles passing through the area 108 in a time T.

Referring more specifically to FIG. 6 and again to FIGS. 3 through 5, by identifying if a constant passing rate in a short time duration is present, e.g., over a time duration of approximately 10 mins a time required to complete passage through a vehicle queueing region 110 may be determined. A vehicle telemetry is leveraged to understand a time taken to complete passage through the lane closure at the vehicle queueing region 110. Initially, a vehicle arrival rate is determined by following the Poisson Point Process. A probability P of a quantity N vehicles arriving during a past time interval t is given by equation 6 below:

$$P\{N(t)=n\} = \{(\lambda t)^n/n!\}e^{-\lambda t} \qquad \text{Equation 6:}$$

Where: P is a probability of vehicle arrival, N is a quantity of vehicles arriving, t is a past time interval of vehicle arrival, n is a total number of vehicles, and λ is the expected headway from above.

A queuing model may be leveraged to identify if a vehicle queue is building in volume in the vehicle queueing region 110. A clustering algorithm may then be applied to identify that a congested region is present and if the queueing region 110 is building in vehicle volume. The various vehicles in the vehicle queueing region 110 report a headway distance and a distance to the lane closure defined as noted herein as the final lane change point $C_O$. The clustering algorithm applying two clusters is then run. Short headway reports located proximate to the lane closure point $C_O$ signify the congested area 72 is present. Longer headway reports further away from the lane closure point $C_O$ signify the non-congested area 70 is present.

An automatic lane change activation system 10 of the present disclosure offers several advantages. These include use of crowd sourced telemetry data to estimate road congestion details. The present system and method leverages probabilistic vehicle arrival rates for lane change control point determinations. The present system and method also applies a feedback mechanism to use turn signal statistics in lane change events to adjust a probability of success of an automatic lane change estimation.

An automatic lane change activation system 10 of the present disclosure provides a system and method for determining a lane change control point for an upcoming closed lane situation that may occur for any reason including due to a construction zone, for crash events, and the like. Lane closures may differ in properties such as geolocations, but the properties that are leveraged herein for lane change control point calculations apply vehicle travel speed, headway telemetry for vehicle population estimation and turn signal telemetry for turn signal statistics which rarely depend on commonly known road properties such as the speed limit, a road geometry, the number of lanes, or which lane is closed. Therefore, lane closure events may be similarly resolved as it is unnecessary to independently evaluate each lane closure situation separately.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for activating a vehicle automatic lane change, comprising:
   obtaining an approximate vehicle location distribution in a non-congested area of a roadway;
   communicating global positioning system (GPS) data and the vehicle location distribution between an in-vehicle computer and a telematics module of a host vehicle;
   performing an estimate of a probability of a successful lane change from a lane change control point (Pc) in the non-congested area to a congestion point ($C_1$) in a congested area of the roadway;
   performing a probability estimation adjustment using turn signal statistics by:
      adjusting a vehicle population or density estimation using the turn signal statistics as feedback; and
      applying a turn signal sample record including a latitude, a longitude, a heading, a signal-status and a timestamp;
   performing a vehicle density adjustment, assuming a lane change duration $T$ and a turn signal active total time duration $\mathsf{T}$, an opportunity seeking duration is $\mathsf{T} - T$;
   inferring a host vehicle speed through telemetry;
   determining a first vehicle count adjustment on a virtual road segment of the roadway assuming a minimum vehicle gap between vehicles on the roadway, and a second vehicle count adjustment on the virtual road segment where the vehicle count is defined by multiple vehicle sample points on a virtual segment length of the roadway;
   determining an average headway of vehicles in the non-congested area;
   calculating a safe lane change headway distance in a target roadway lane for the host vehicle; and
   generating control signals including a lane change execution signal to initiate and control vehicle automatic lane change to the target roadway lane in the non-congested area for the host vehicle.

2. The method of claim 1, further including:
   estimating a lane change opportunity applying an updated expected headway; and
   applying a predetermined speed difference threshold when a speed difference between vehicles in adjacent lanes of the roadway is present.

3. The method of claim 1, further including comparing a vehicle arrival rate and a vehicle passing rate at a lane closure over time to determine when the congested area is present.

4. The method of claim 1, further including:
   identifying if a constant passing rate in a short time duration defining a time duration of 10 minutes occurs in a vehicle queueing region;
   calculating a time required to complete passage through the vehicle queueing region; and
   leveraging a vehicle telemetry to identify a time taken to complete passage through a lane closure at the vehicle queueing region.

5. The method of claim 4, further including:
   leveraging a queuing model to identify if a vehicle queue is building in vehicle volume in the vehicle queueing region; and
   applying a clustering algorithm to identify when the congested area is present and if the queueing region is building in vehicle volume.

6. A method for performing a vehicle automatic lane change, comprising:
   obtaining an approximate vehicle location distribution in a non-congested area of a roadway, including having a global positioning system (GPS) position, a headway telemetry position, a host lane determination and a per-lane vehicle position following a Poisson Point Process of expected headway in the non-congested area;
   adjusting a vehicle population or density estimation by assuming a lane change duration $T$ and a turn signal active total time duration $\mathsf{T}$, an opportunity seeking duration is $\mathsf{T} - T$;
   inferring a host vehicle speed through telemetry;
   determining a first vehicle count adjustment on a virtual road segment of the roadway assuming a minimum vehicle gap between vehicles on the roadway, and a second vehicle count adjustment on the virtual road segment where the vehicle count is defined by multiple vehicle sample points on a virtual segment length of the roadway;
   performing an estimate of a probability of a successful lane change from a lane change control point ($P_C$) to a congestion point ($C_1$) in the congested area;
   performing a probability estimation adjustment using turn signal statistics by:
      adjusting a vehicle population or density estimation using the turn signal statistics as feedback; and
      applying a turn signal sample record including a latitude, a longitude, a heading, a signal-status and a timestamp;
   determining an average headway of vehicles in the non-congested area;
   calculating a safe lane change headway distance in a target roadway lane for the host vehicle;
   determining a time gap to perform a lane change at least once between any two consecutive vehicle arrivals using an assumed vehicle speed of upcoming vehicles; and
   generating control signals including a lane change execution signal to initiate and control vehicle automatic lane change to the target roadway lane in the non-congested area for the host vehicle.

* * * * *